(12) United States Patent
Cocchi et al.

(10) Patent No.: US 11,540,533 B2
(45) Date of Patent: Jan. 3, 2023

(54) METHOD AND APPARATUS FOR MAKING AND DISPENSING LIQUID OR SEMI-LIQUID FOOD PRODUCTS

(71) Applicant: ALI GROUP S.R.L.—CARPIGIANI, Cernusco sul Naviglio (IT)

(72) Inventors: Andrea Cocchi, Calderara di Reno (IT); Mauro Tortonesi, Ferrara (IT); Cesare Stefanelli, Bologna (IT); Roberto Lazzarini, Reggio Emilia (IT)

(73) Assignee: ALI GROUP S.R.L.—CARPIGIANI, Cernusco sul (IT)

( * ) Notice: Subject to any disclaimer, the term of this patent is extended or adjusted under 35 U.S.C. 154(b) by 7 days.

(21) Appl. No.: 16/435,826

(22) Filed: Jun. 10, 2019

(65) Prior Publication Data

US 2019/0289876 A1 Sep. 26, 2019

Related U.S. Application Data

(62) Division of application No. 14/223,215, filed on Mar. 24, 2014, now abandoned.

(30) Foreign Application Priority Data

Mar. 28, 2013 (IT) .......................... BO2013A000134

(51) Int. Cl.
*A23G 9/28* (2006.01)
*A23G 7/00* (2006.01)
(Continued)

(52) U.S. Cl.
CPC ............... *A23G 9/281* (2013.01); *A23G 7/00* (2013.01); *A23G 9/04* (2013.01); *A23G 9/22* (2013.01); *A23G 9/282* (2013.01)

(58) Field of Classification Search
CPC . A23G 9/281; A23G 9/04; A23G 9/22; A23G 9/282; A23G 7/00
See application file for complete search history.

(56) References Cited

U.S. PATENT DOCUMENTS

2003/0080138 A1 5/2003 Chirnomas
2009/0191318 A1* 7/2009 Cocchi .................. A23G 9/225
426/231
(Continued)

FOREIGN PATENT DOCUMENTS

CN 102164504 A 8/2011
CN 102726590 A 10/2012
(Continued)

OTHER PUBLICATIONS

Japanese Office Action dated Dec. 5, 2017 for counterpart Japanese Patent Application No. JP 2014-066059.
(Continued)

*Primary Examiner* — Steven N Leff
(74) *Attorney, Agent, or Firm* — Shuttleworth & Ingersoll, PLC; Timothy J. Klima (57) ABSTRACT

A method for making and dispensing liquid or semi-liquid food products is implemented in a machine including a one containment tank for containing a liquid basic product, a processing circuit for that product, to obtain a liquid or semi-liquid food product, a dispenser for dispensing the food product, an actuator acting on the basic product and/or on the food product and/or on parts of the machine, and a user interface for controlling the making and dispensing. The method, implemented by a control and processing unit connected with the user interface, includes: measuring one or more operating parameters, activating a first data communication for obtaining the operating parameters, receiving the operating parameters, activating a second data communication with the user interface for receiving commands
(Continued)

representing selectable settings of preparations, and controlling the actuator as a function of the operating parameters and commands received.

7 Claims, 4 Drawing Sheets (51) Int. Cl.
*A23G 9/04* (2006.01)
*A23G 9/22* (2006.01)

(56) References Cited

U.S. PATENT DOCUMENTS

| | | |
|---|---|---|
| 2009/0323462 A1 | 12/2009 | Cocchi et al. |
| 2010/0139493 A1 | 6/2010 | Nevarez et al. |
| 2010/0242497 A1 | 9/2010 | Bertone |
| 2011/0297272 A1 | 12/2011 | Hammonds et al. |
| 2012/0251697 A1 | 10/2012 | Cocchi et al. |
| 2012/0312049 A1 | 12/2012 | Downs et al. |

FOREIGN PATENT DOCUMENTS

| | | |
|---|---|---|
| CN | 103002751 A | 3/2013 |
| EP | 02067407 A2 | 6/2009 |
| EP | 2140768 | 1/2010 |
| IT | MI20081214 | 1/2010 |

OTHER PUBLICATIONS

Chinese Office Action dated Aug. 2, 2018 for counterpart Chinese Patent Application No. CN 201410123866.1.
Italian Search Report dated Dec. 20, 2013 from counterpart Italian App No. BO2013A000134.

* cited by examiner

METHOD AND APPARATUS FOR MAKING AND DISPENSING LIQUID OR SEMI-LIQUID FOOD PRODUCTS

This application is a divisional of U.S. application Ser. No. 14/223,215 filed Mar. 24, 2014, which application claims priority to Italian Patent Application BO2013A000134 filed Mar. 28, 2013. The entirety of both applications are incorporated by reference herein.

BACKGROUND OF THE INVENTION

This invention relates to a method for making and dispensing liquid and semi-liquid food products.

The invention also relates to an apparatus or machine for making and dispensing liquid and semi-liquid food products, implementing the method, in particular, a mixing and freezing unit, a pasteurizer, a crushed-ice drink maker and the like.

With reference to the prior art, apparatuses for making and dispensing liquid and semi-liquid food products comprise an electronic unit for controlling the actuators forming part of the apparatus (compressor for the cooling cycle, mixer blades or stirrers, etc.).

The control unit is equipped with a plurality of electronic control cards, each serving a specific function.

The control unit also comprises distributed electronics including one or more microcontrollers with respective firmware.

This type of control unit is not optimized because it replicates functions on the different cards/microcontrollers: this translates as slower and less effective control of apparatus drives.

Further, a control unit with a structure of this type tends to reduce the operating reliability of the apparatus: in effect, damage to any one electronic card may negatively affect the normal operation of the cards/actuators of the apparatus itself.

A need which is felt particularly strongly by operators in the trade is that of having a method/apparatus for making and dispensing liquid and semi-liquid food products which allows particularly efficient, fast and reliable control.

SUMMARY OF THE INVENTION

This invention therefore has for an aim to provide a method/apparatus for making and dispensing liquid and semi-liquid food products which allows particularly efficient and reliable control.

Another aim of the invention is to provide a method/apparatus which allows making and dispensing different liquid and semi-liquid food products even simultaneously and which also allows particularly efficient and robust control.

This aim is achieved by a method for making and dispensing liquid and semi-liquid food products comprising the technical features set out herein.

This aim is achieved by an apparatus for making and dispensing liquid and semi-liquid food products comprising the technical features set out herein.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a non-limiting example embodiment of the invention and in which:

DESCRIPTION OF THE PREFERRED EMBODIMENTS

With reference to the accompanying drawings, the numeral 1 denotes an apparatus or machine for making and dispensing liquid and semi-liquid food products according to this invention. The apparatus 1 can be used to make ice cream, granitas or warm products (custard, chocolate, and the like).

In one embodiment, the apparatus 1 allows only ice cream to be made. For this embodiment, and in particular for the description of the mixing and freezing unit and for the specific features of the operation of the mixing and freezing unit, reference is made to Italian patent application No. MI2008A001214 and to European patent application No. EP2140768 in the name of the same applicant as this invention.

Figure 1:
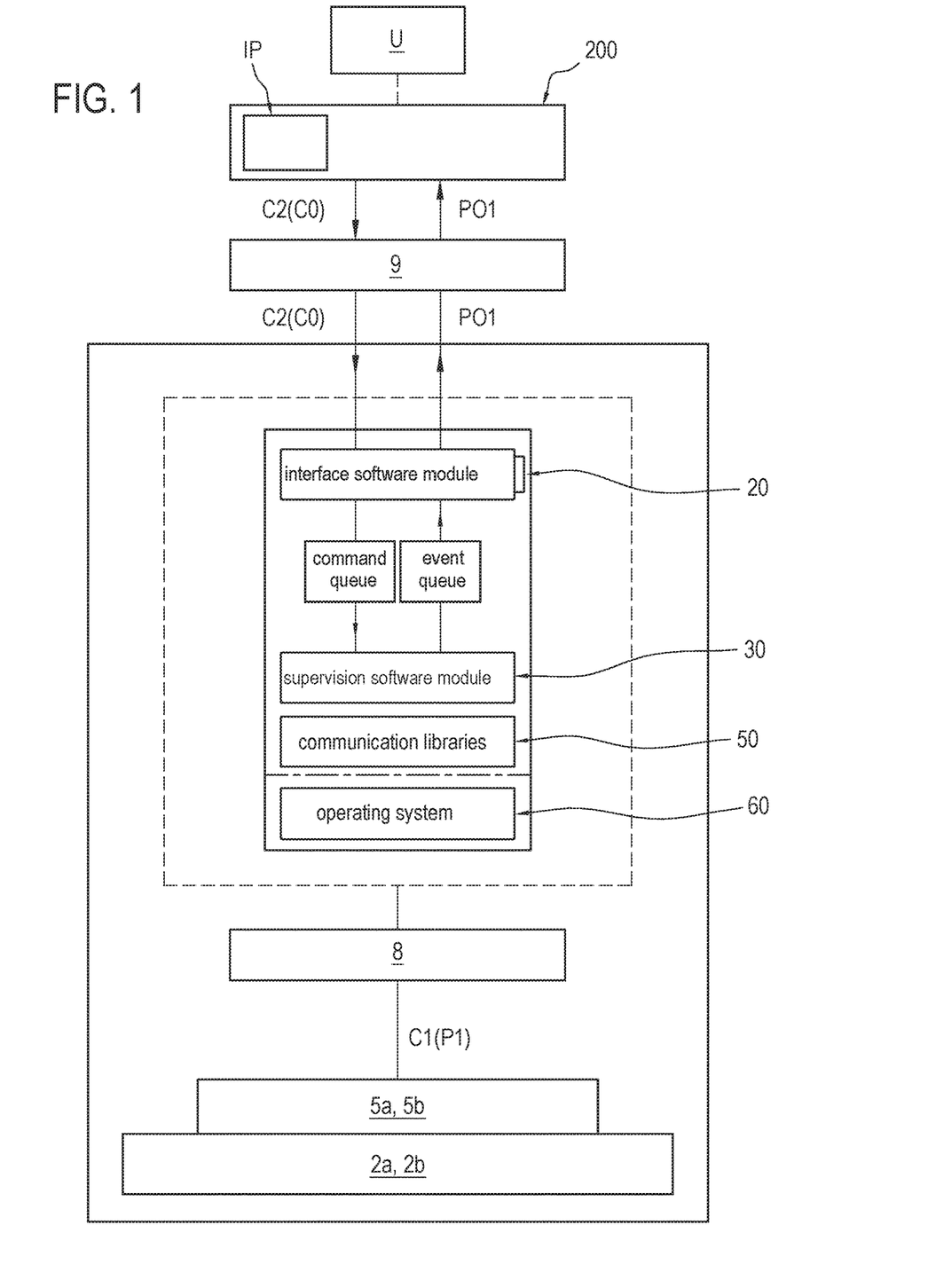
FIG. 1 is a general block diagram of the essential components of the apparatus for making and dispensing liquid and semi-liquid food products according to the invention.
Figures 1A, 1B:
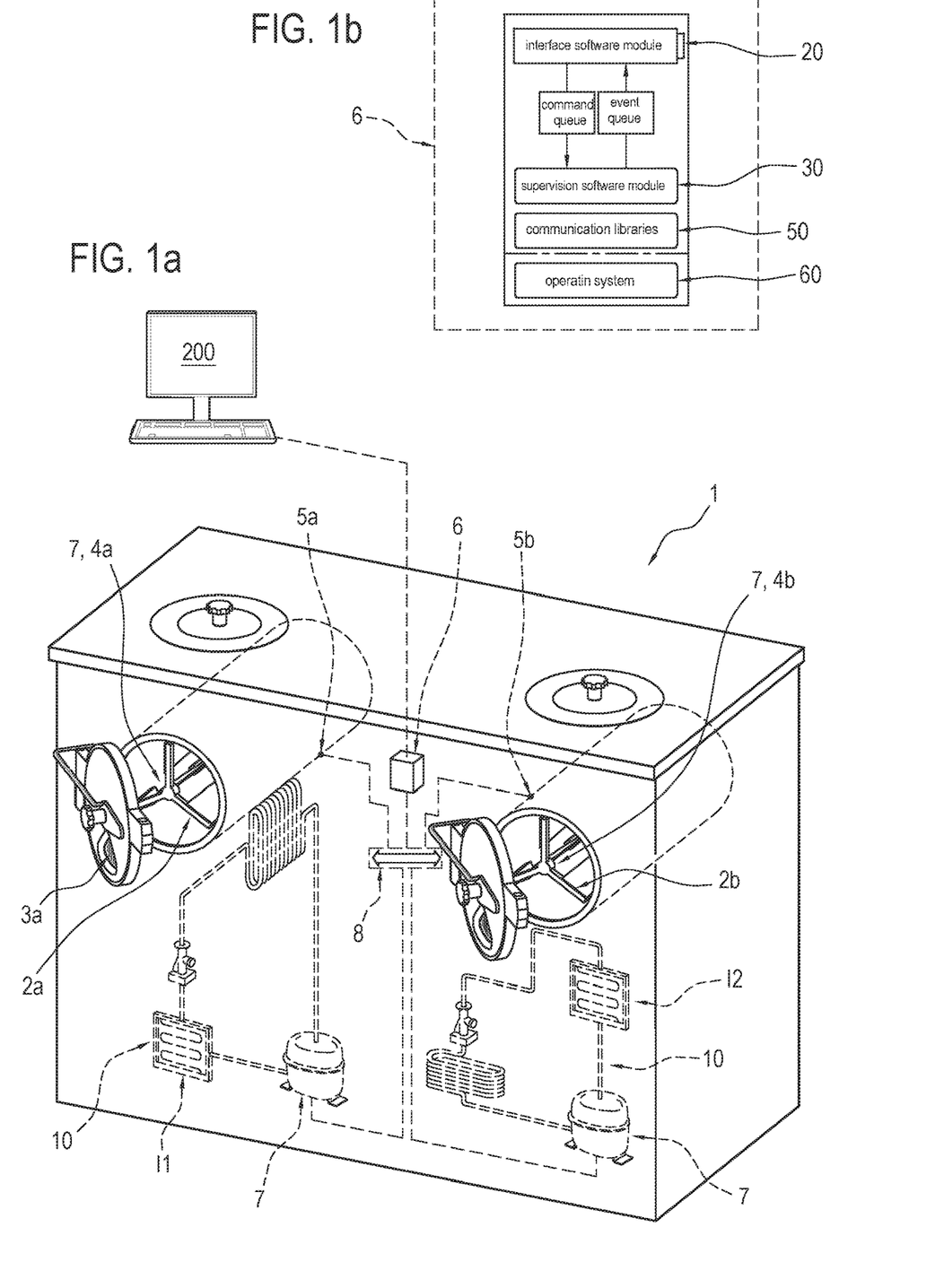
FIG. 1a is a schematic view of a first part of the apparatus of FIG. 1.
FIG. 1b is a schematic view of the control unit of the apparatus of FIG. 1.

The apparatus 1 for making and dispensing liquid or semi-liquid food products comprises:
 at least one containment tank 2a, 2b for containing a liquid basic product;
 a processing circuit 10 for the basic liquid product, for obtaining a liquid or semi-liquid food product and preferably comprising at least one system I1 for cooling the basic liquid product and/or a system I2 for heating the basic liquid product;
 dispensing means 3a, 3b for dispensing the food product;
 at least one actuator 7 acting on the basic product and/or on the food product and/or on parts of the apparatus 1;
 at least one sensor 5a, 5b for measuring one or more operating parameters of the apparatus 1;
 a user interface 200 (preferably a software interface) configured for controlling the making and dispensing;
 a control and processing unit 6, connected with the user interface 200, and connected at least to the at least one sensor 5a, 5b and to the at least one actuator 7, for controlling the operation of the apparatus 1.

It should be noted that the apparatus 1, as illustrated in FIG. 1, may also comprise a plurality of containment tanks for containing liquid basic products (which may be the same type of liquid product or different types of liquid products).

More specifically, the apparatus 1 illustrated in FIG. 1a comprises a first containment tank 2a for a first basic liquid product and a second containment tank 2b for a second basic liquid product.

The term "containment tank" is used to denote a cylinder or, more generally, a container for the basic liquid product.

The processing circuit 10 for the basic liquid product preferably comprises a system I1,I2 for cooling and/or heating the basic liquid product;

The system I1,I2 preferably comprises a first exchanger for giving off heat and a second exchanger for absorbing heat, a compressor, and a throttle valve.

It should be noted that the apparatus 1 comprises, preferably, a single compressor for all the containment tanks for the basic liquid product.

In the embodiment illustrated in FIG. 1a, the apparatus 1 comprises, purely by way of example, a first cooling system I1 for absorbing heat from (cooling) the first containment tank 2a and a second system I2 for giving off heat to (heating) the second containment tank 2b.

In the example illustrated, the heating system I2 is physically separate from the cooling system I1.

By way of non-limiting example, it should be noted that in embodiments not illustrated, the machine 1 comprises a single heating/cooling system having a single compressor.

The dispensing means 3a,3b for dispensing the food product preferably comprise a nozzle and/or a door for dispensing the end product.

The apparatus 1 comprises one or more actuators 7, where this term is used to denote any element or unit acting on the basic liquid product, on the end product or on a part of the apparatus 1.

Purely by way of an example, the actuators 7 comprise: the compressor of the cooling and/or heating system; the stirrer 4a,4b of the containment tank 2a,2b, etc.

The apparatus 1 also comprises one or more sensors 5a,5b for measuring the operating parameters P1 of the apparatus 1 (where the term "operating parameters" is used to denote an operating or rest state of any one of the components of the apparatus 1 or of the basic liquid or semi-liquid product and/or end product).

Preferably, the apparatus 1 comprises one or more sensors 5a,5b associated with each containment tank 2a,2b (for example, a temperature sensor).

The apparatus 1 preferably also comprises a sensor for measuring the speed of rotation of the compressor.

The apparatus 1 may further comprise one or more sensors for measuring a state of the refrigerant fluid (pressure, temperature) at a point in the cooling/heating system I1,I2.

The apparatus 1 may also comprise one or more sensors for detecting the open/closed state of the door of the containment tank 2a,2b.

According to the invention, the apparatus 1 comprises a data communication channel 8 between the at least one sensor 5a,5b, at least one actuator 7 and the control and processing unit 6.

The data communication channel 8 is preferably a channel of the MODBUS type.

Still more preferably, the data communication channel 8 allows data communication through the RTU or TCP/IP protocol or, if necessary, both.

Also preferably, the data communication channel 8 allows data communication with the compressor and with the electric valves using the RTU protocol and with the motors using the TCP/IP protocol.

In the operation of the apparatus according to the invention, the control and processing unit 6, connected with the user interface 200 measures one or more operating parameters P1 of the apparatus 1 through at least one sensor 5a,5b.

Thus, the unit 6 activates a first data communication C1 with the at least one sensor 5a, 5b for obtaining the operating parameters P1.

The unit 6 also receives the operating parameters P1 through a first communication channel 8.

It should be noted that the unit 6 takes a reading of the sensor 5a, 5b through the communication channel 8 in order to obtain the operating parameters P1.

To carry out these steps, advantageously according to the invention, the control and processing unit 6 comprises a supervision software module 30 configured for measuring one or more operating parameters P1 of the apparatus 1 using at least one sensor 5a,5b.

The supervision software module 30 is also configured for activating a first data communication C1 with the at least one sensor 5a, 5b for obtaining the operating parameters P1.

The supervision software module 30 is also configured for receiving the operating parameters P1 through a first communication channel 8.

In the operation of the apparatus according to the invention, the control and processing unit 6 advantageously activates a second data communication C2 with the user interface 200.

The user interface 200 is configured for receiving commands C0 from a user U representing settings of preparations IP which can be selected.

In other words, from the user interface 200 it is possible to select the preparations that the apparatus has to make.

The control and processing unit receives the commands C0 through a second communication channel 9.

To carry out these steps, advantageously according to the invention, the control and processing unit 6 comprises an interface software module 20 connectable to the user interface 200 and configured to activate the second data communication C2 with the user interface 200, where the latter is configured for receiving commands C0 from a user U representing settings of preparations IP which can be selected.

The interface software module 20 is also configured for receiving the commands C0 through the second communication channel 9.

In the operation of the apparatus according to the invention, the control and processing unit 6 advantageously manages at least the supervision software module 30 and the interface software module 20.

To carry out these steps, advantageously according to the invention, the control and processing unit 6 comprises a processing software module 60 configured for managing, in the control and processing unit 6, the performance at least of the supervision software module 30 and of the interface software module 20.

In the operation of the apparatus according to the invention, the control and processing unit 6 advantageously controls the at least one actuator 7 as a function of the operating parameters P1 obtained through the supervision software module 30.

The control and processing unit 6 controls the at least one actuator 7 also as a function of the commands C0 obtained through the interface software module 20.

To carry out these steps, advantageously according to the invention, the processing software module 60 is also configured for controlling the at least one actuator 7 as a function of the operating parameters P1 obtained through the supervision software module 30 and, alternatively or in addition, also as a function of the commands C0 obtained through the interface software module 20.

Advantageously, according to the invention, the processing software module 60 is an operating system.

Preferably, the operating system comprises a Linux distribution.

Advantageously, according to the invention, all the steps performed by the control and processing unit 6 are implemented by software instructions.

Advantageously, according to the invention, the control and processing unit 6 continuously monitors the operating parameters P1 received from the at least one sensor 5a,5b.

The unit 6 also processes the operating parameters P1 determining processed operational information POI.

Advantageously, transmission of information between the different modules/components of the system occurs through communication libraries 50: this allows the information between the different modules/components of the system to be transmitted in a common format.

The unit 6 also sends to the user interface 200 the processed operational information POI, this information determining the settings of preparations IP which can be selected.

According to the invention, the step of receiving the operating parameters P1 through the first communication channel 8 follows the steps of processing the operating parameters P1 and sending to the user interface 200.

To carry out these steps, advantageously according to the invention, the supervision software module 30 is configured to monitor continuously the operating parameters P1 received from the at least one sensor 5a, 5b.

The supervision software module 30 is also configured for processing the operating parameters P1 as a function of communication libraries 50 determining processed operational information POI.

The supervision software module 30 is further configured for sending to the user interface 200 the processed operational information POI, this information determining the settings of preparations IP which can be selected.

It should be noted that the term "software module or component" used in this description denotes a plurality of software instructions which can be performed on the processor to implement specific functions.

The structure of the control and processing unit 6 is a software architecture divided into two more levels, based on the use of two or more intercommunicating software components (20,30).

Preferably, the software components (20,30) communicate with each other asynchronously, performing their respective functions independently of each other.

It should be noted that the operating system 60 is preferably a Linux distribution (made up of essential software sub-components).

The interface software module 20 is an application which manages interaction with the user. More specifically, the interface software module 20 manages the reception of commands entered by a user U through a user interface 200 (FIGS. 1 and 1b).

In practice, the interface software module 20 is configured for receiving user input (commands) through the user interface 200 and to make available to the user U the operating parameters P1, processed as POI, that is to say, the information on parameters, variables and state of the apparatus 1.

It should be noted that the apparatus 1 preferably comprises the interface 200, that is to say, a device configured to allow a user U to enter commands C0 to make information available on the apparatus itself in visual and/or sound form.

Preferably, but not necessarily, the interface comprises an LCD display.

It should be noted that the interface software module 20 is operatively connected to the interface 200 and to the supervision software module 30 to allow information to be exchanged between these components.

More specifically, the interface software module 20 is configured for receiving from the supervision software module 30 the operating parameters P1, that is to say, information relating to variables or parameters of the apparatus 1 derived from the reading or processing of the signal of the sensors 5a,5b.

The software module 20 is also configured to make these operating parameters P1, processed as POI, available as information displayed on the interface 200.

The user interface 200 is also configured to allow the operator to set up the recipes of the apparatus 1 (for example, by adding new recipes or modifying the default ones).

In effect, according to this aspect, the user can customize a recipe by entering information using the interface.

The user interface 200 is also configured to send to the supervision software module 30 information regarding the commands entered by the operators (i.e., recipe customization, stopping the machine 1, that is, "Stop", clean, stir, etc.).

With reference to the supervision software module 30 (hereinafter also referred to as "supervisor module"), this module is a software application configured to control and supervise the operations performed by the hardware (that is, the actuators 7) of the machine 1.

It should be noted that the supervision software module is configured to control both independent hardware resources (actuators 7, such as the motors and electric valves, for example) and shared hardware resources (actuators 7, such as, for example, a compressor of a system serving two or more product processing tanks).

The supervisor module 30 is advantageously configured to operate in an event based mode.

According to this mode, program flow, that is, the performance of instructions, is determined by the occurrence of events.

The supervisor module 30 is thus configured to perform an infinite loop of instructions including instructions which continuously check for the information to be processed, that is, the events.

This "event based" mode of operation advantageously allows maximizing responsiveness and minimizing response times after receiving new commands or information.

More in detail, the supervisor module 30 is configured to be interfaced with the user interface software module 20 to receive the commands from the user through the user interface 200.

The supervision software module 30 is also configured to carry out safety checks and, based on these checks, to start corresponding operating procedures (for example, to change the state of the apparatus 1 or the production cycle).

It should be noted that the supervisor software module 30 is configured to continuously monitor the information sent by the hardware (sensors, actuators) through the communication channel 8, process it and periodically send the result of the processing to the user interface 200 so it can be displayed.

The supervisor software module 30 communicates with the actuators 7 of the machine 1 (motors, electric valves, compressor) and sensors (5a,5b) through the communication libraries 50 (installed in the processor of the control and processing unit 6).

The communication libraries 50 preferably comprise COTS (commodity off the shelf) software modules.

Also, preferably but not necessarily, the communication libraries 50 comprise Open Source type software modules It should be noted that the supervisor module 30 uses the communication libraries 50 for reading and writing in the communication channel 8.

For example, the libraries 50 allow the supervisor software module 30 to communicate the data on the channel 8 both through serial port and through TCP/IP.

Advantageously, the communication libraries thus facilitate the operations by which the software components, in particular the supervisor module 30, read and write on the communication buses.

The communication libraries also make it possible not to lock the control and processing unit 6 to a specific communication bus, thus increasing the flexibility of the apparatus 1.

Preferably, the recipes, the commands and the configurations of the control and processing unit 6 are stored in a proprietary format.

The recipes are described through sequences of basic steps (for example, heating, cooling, stirring, etc.).

Advantageously, the apparatus 1 according to the invention brings the following advantages.

The apparatus 1 having a control and processing unit 6 equipped with an operating system and software modules 20,30 of the type described above can be easily adapted or configured to the effective needs of the purchaser (or user) of the apparatus.

That means the apparatus 1 can very easily be configured to meet the customer's effective needs, without having to modify or develop a plurality of especially dedicated electronic control units.

Another advantage of the apparatus 1 according to the invention is due to the adoption of a control and processing unit 6 whose architecture is based on software components (modules) 20,30 which independent of each other, that is, uncoupled and configured to communicate with each other through an asynchronous interaction mode.

This architecture of the control and processing unit 6 allows the dependability of the apparatus 1 to be considerably increased: in other words, the apparatus 1 is more reliable in the event of faults.

In effect, in the event of malfunctions in non-critical software components or modules, such as, for example, malfunctions in the interface software module 20, the more important software components continue to operate correctly.

Also, the Linux based operating system allows further increasing considerably the robustness (dependability) of the apparatus 1 and reducing the production costs thereof.

It should also be noted that dividing the functions performed by the control and processing unit 6 into two or more software applications, that is to say, software modules which are performed concurrently on a single operating system, advantageously allows configuring the more critical applications (such as the supervisor module 30) in such a way that they are performed more frequently and/or with higher priority.

The performance of the machine 1 can be further improved by running the supervisor software component 30 in the kernel space of the operating system.

In terms of costs, it should be noted that the adoption for the apparatus 1 of a control and processing unit 6 equipped with a single control card makes it possible to reduce the development and production costs of the apparatus 1.

Described in more detail below are the interface software module 20 and the supervisor software module 30.

It should be noted that the interface software module 20 comprises two main subcomponents: a first software interface subcomponent 20a and a second software interface subcomponent 20b.

The first software interface subcomponent 20a is configured to read the application and/or operating data received from the supervisor module 30 to make them available to the user through the user interface 200.

The second software interface subcomponent 20b is configured to manage the interaction with the user (that is, to receive the commands entered by the user U through the user interface 200).

The interface software module 20 comprises a plurality of submodules, each assigned to a specific function.

Figure 2:
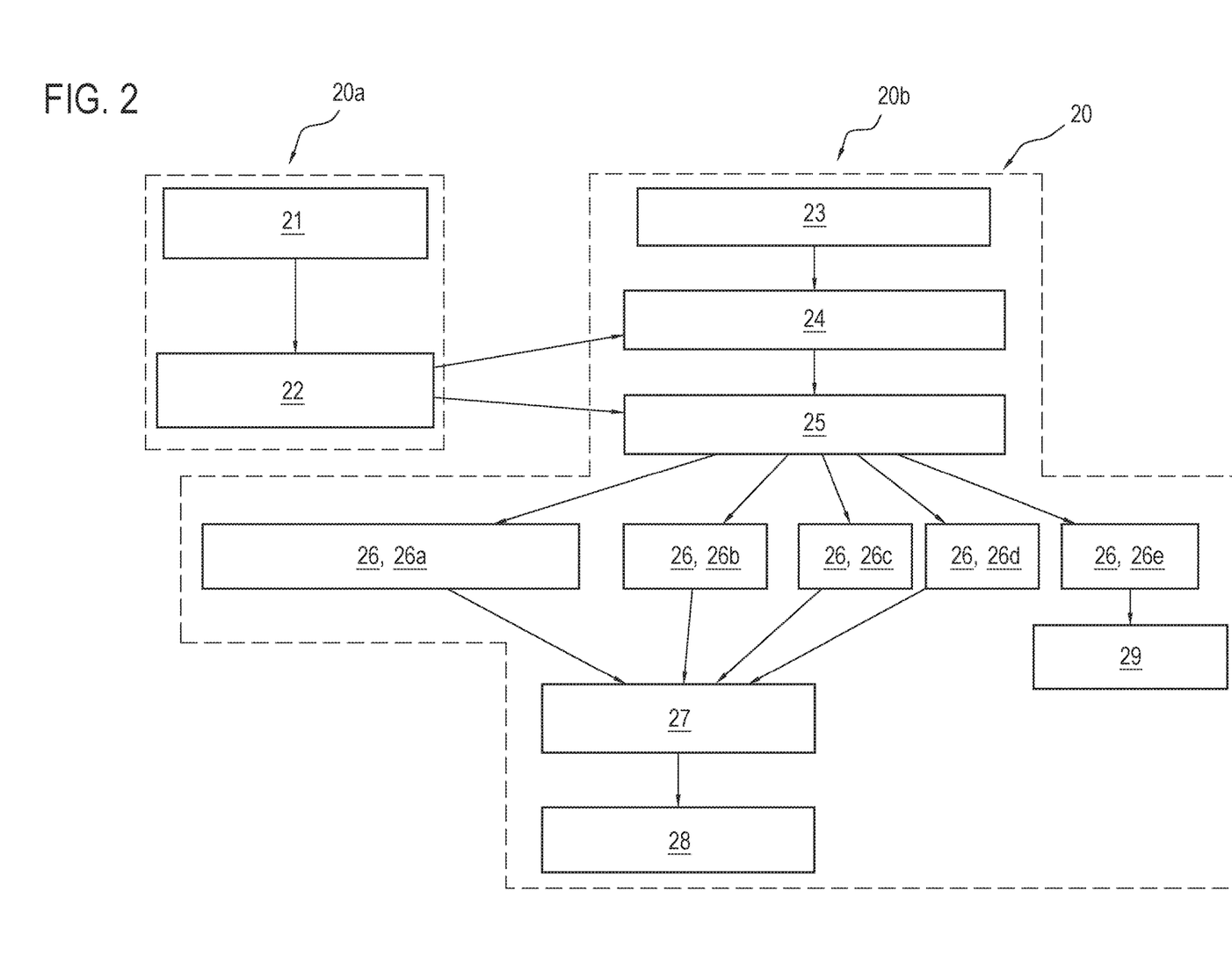
FIG. 2 is a schematic view of a software component of the control unit of FIG. 1b according to the invention.

Below is a brief description of the functions of the submodules of the interface software module 20, represented in FIG. 2.

The reference numeral 21 denotes a software submodule for managing the flow of data from the at least one sensor 5a,5b, through the communication channel 8 and the supervisor software module 30.

Whenever data is made available on the communication channel 8, the management software submodule 21 is activated to receive the data from the communication channel 8.

In the foregoing, these data are denoted by the term operating parameters P1.

A further submodule 22 saves the data P1 read from the communication channel 8 to specific data structures (for example, to make them available to the interface or for the management of the application flow).

The data structures which host these data are configured to optimize the packing of the information, drastically reducing their size and communication overhead during their transmission.

The reference numeral 23 denotes a software submodule for initializing the data structures in a format that can contain the data P1 read from the supervisor module 30 and the variables containing system information for the operation of the interface software component 20.

The reference numeral 24 denotes a software submodule configured for processing and making available to the user interface 200 a display representing the operating state of all the cylinders (product containment tanks 2a,2b) of the apparatus 1.

Preferably, the display is structured in such a way as to graphically divide the information into a plurality of zones, where each display zone is associated with a cylinder (2a,2b), that is, contains information relating to that cylinder (2a,2b).

By way of non-limiting example, each display zone shows the recipe being made in the cylinder (2a,2b), the current step of the recipe being performed and specific parameters which depend on the step being performed (which give the user more details on the operating state).

The user interacts with the interface software module 20 through a user interface 200, consisting for example of an LCD touchscreen panel.

The user can display more information about a cylinder, or containment tank (2a,2b), by selecting that cylinder from the user interface 200.

The reference numeral 25 denotes a software submodule configured to process and make available a detail display associated with a cylinder: this display contains information relating to the operating state of the selected cylinder.

The reference numeral 26 denotes a software submodule configured to perform one or more of the following functions on one of the cylinders:

26a: create a recipe.

The software submodule 26 allows the user to select the category and desired recipe and to place it in production using the Start button.

26b: stop the production of a recipe;

26c: start cleaning a cylinder;

26d: start stirring the product (that is, issue a command to at least one actuator 7 operating on the product in such a way as to stir it);

26e: allow the user to manage the recipes.

The reference numeral 27, denotes a software submodule configured to store data (in the dedicated structures) following selection of one of the functions described above with reference to the submodule 26.

The submodule 28 of the interface module is configured to send one or more commands (issued by the user following the selection made on the interface) to the supervisor software component 30.

The reference numeral 26e denotes a software submodule of the interface module 20 configured to allow recipe management.

More in detail, the software submodule 26e allows customizing the recipes stored in a database.

It should be noted that a software submodule 29 is also provided which is operatively connected to the software submodule 26e to allow reading/writing of configurations files containing information about the recipes.

It should be noted that the submodules 21-22 form part of the first software interface component 20a, whilst the submodules 23-29 form part of the second software interface component 20b.

Figure 3:
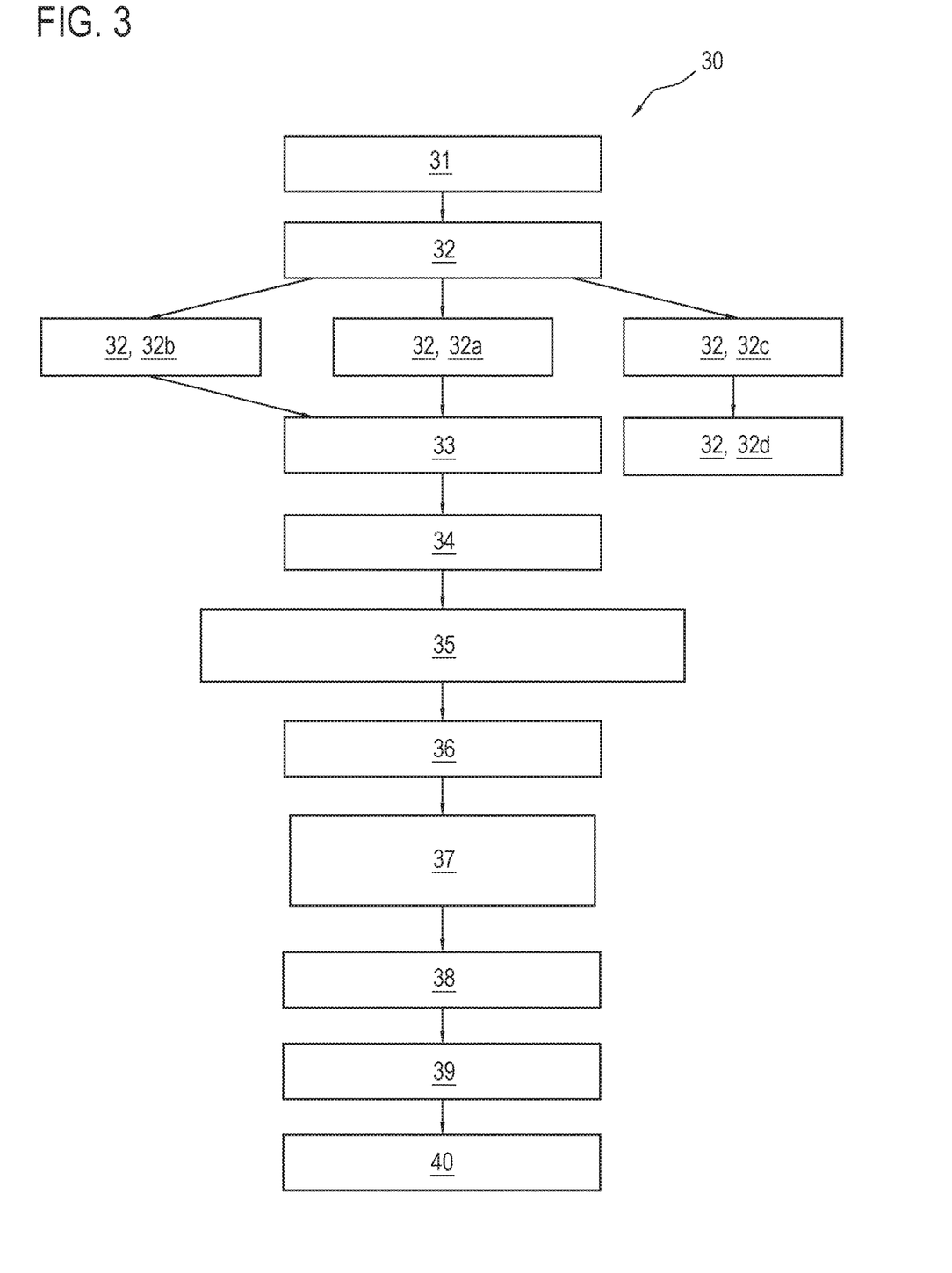
FIG. 3 is a schematic view of another software component of the control unit of FIG. 1b according to the invention.

FIG. 3 is a block diagram representing the structure of the supervisor software module 30 and from which it is possible to infer the set of submodules 31-40 making up the supervisor software module 30.

The reference label 31 in FIG. 3 denotes a software submodule of the supervisor module 30 configured to initialize the actuators 7 of the apparatus 1 (for example, the motors, the electric valves, the compressor) in the "STOP" state.

The software submodule 31 is configured to guarantee that the apparatus 1 is in the "STOP" state whenever it is powered up. The software submodule 31 is also configured to initialize all the supporting variables used in the supervisor software module 30.

The reference numeral 32 denotes a software submodule containing instructions configured to allow running of a cycle, that is, an infinite loop, which performs different functions, denoted by the references 32a, 32b, 32c.

A first function 32a of the software submodule 32 comprises reading data from the communication channel 8 (Modbus) at predetermined intervals (preferably every 0.2 seconds).

The software submodule 32 manages communication with the apparatus 1 through the communication channel 8 (Modbus).

A second function 32b of the software submodule 32 comprises processing the commands issued by the user through the user interface 200.

A third function of the software submodule 32 comprises obtaining (32c) and saving (32d) the current state of the apparatus 1 in its entirety (useful, for example, to store it in the event of a power failure).

More in detail, the software submodule 33 analyses the data P1 read from the communication channel 8 (Modbus) to check for generic alarm signals, that is to say, signals regarding a fault in the apparatus 1 in its entirety, such as. for example, a fault in the pressure switch and/or in the compressor.

If any such generic alarm signal is found, the software submodule 33 sets the machine 1 to a "STOP" state The reference numeral 34 denotes a software submodule configured to analyze the data P1 received from the communication channel 8 to check for alarm signals associated with the cylinders (for example, alarms regarding the motors, the electric valves, the probes).

It should be noted that the software submodule 34 is configured to drive the apparatus 1 as a function of the alarm signals.

In other words, the software submodule 34 is configured to perform a predetermined operation as a function of the alarm signal received.

For example, if a temperature probe fails while an ice cream cycle is being performed and that probe is not used in the processing cycle, then a warning message is displayed in the interface.

Again by way of example, if a motor connected to a stirrer fails and that motor is necessary to stir the product during production of a recipe, then the software submodule 34 inhibits the process cycle and prevents it from proceeding.

The reference numeral 35 denotes a software submodule configured to update the data structures with the values read from the communication channel 8 necessary for executing the control algorithm.

The reference numeral 36 denotes a software submodule for controlling process flow.

The software submodule 36 comprises a first state based machine (that is, a computer algorithm of the state based type) which controls the performance of a recipe (that is, of the commands issued by the user) on a single cylinder.

In other words, the supervision software module 30) comprises a first state based machine 36, comprising a plurality of states for controlling the at least one actuator 7 as a function at least of the signal of the at least one sensor 5a, 5b and/or the received commands issued by the user.

The reference numeral 37 denotes a further software submodule for controlling process flow.

The software submodule 37 comprises a second state based machine (that is, a computer algorithm of the state based type) for controlling the actuators 7 of the machine 1 in its entirety.

Preferably, the second state based machine also controls the state of each containment tank 2a,2b.

It should be noted, therefore, that the process flow control algorithm is divided into two state based machines, namely a first state based machine and a second state based machine which determine the state of, and control the performance of the recipe in, the individual cylinders.

The first state based machine processes the state of progress of a recipe/command issued by the user.

At each step of the state based algorithm, the system checks for the parameters for changing from the current state to the next state: if the condition for changing from one state to another is satisfied, the state stored for the cylinder is modified.

For example, if the "pasteurize" cycle is requested in a given cylinder, the first state based machine updates the registers which must be written, through the channel 8, for example via Modbus, to regulate the electric valves, enable the motor and adjust the speed thereof.

The second state based machine is also configured to manage the simultaneous operation of the cylinders, that is, the performance of process cycles simultaneously in two or more cylinders.

More specifically, the second state based machine is also configured to control and adjust the speed of the compressor of the cooling/heating system I1,I2, where the compressor is shared between different cylinders.

Advantageously, the fact the single compressor is used allows the machine structure to be greatly simplified, thereby reducing the costs associated with the processing circuit 10.

More in detail, where the compressor is shared between different cylinders, the second state based machine receives a signal relating to the current state of each cylinder and calculates the frequency of the compressor suitable for correctly making the recipes in progress in the different cylinders.

The reference numeral 38 denotes a software subcomponent configured to write the data obtained in the specific data structures.

The reference numeral 39 denotes a software subcomponent configured to send data to the actuators 7 of the machine (compressor, motor, electric valves) through the communication channel 8.

It should also be noted that the reference numeral 40 denotes a software subcomponent configured to send the data structures to the user interface software component 20.

With regard to the advantages of the machine 1 according to the invention, attention is drawn to the following.

The architecture of the machine 1 according to the invention is much simpler than that of traditional machines of known type, where the control and processing unit 6 comprises a plurality of interconnected electronic cards.

In effect, known machines equipped with a control and processing unit 6 based on two or more control cards with traditional microcontrollers involve replicating certain functions (in particular, information flow management functions) on each of the control cards, with obvious drawbacks in terms of slower processing of information and higher system complexity.

Advantageously, the apparatus 1 according to the invention, comprising a control and processing unit 6 with separate software components (20,30) running on a single processor, is particularly efficient, because it optimizes information flow management, and also particularly fast.

Moreover, machines of known type comprise microcontrollers having single component software which controls not only the application logic and the user interface but also the information flow management logic.

The machine of the invention, on the other hand, is advantageously provided with two or more software components running on the same operating system, each one assigned to specific functions not replicated by the other modules.

What is claimed is:

1. A method for making and dispensing liquid or semi-liquid food products in a machine for making and dispensing liquid or semi-liquid food products, comprising steps as follows:
   providing that the machine comprises:
      at least one containment tank for containing a basic liquid product;
      a processing circuit for the basic liquid product, for making a liquid or semi-liquid food product;
      a dispenser for dispensing the food product;
      at least one actuator acting on the basic liquid product, the food product, and/or parts of the machine;
      a compressor for cooling and/or heating the basic liquid product and/or the food product;
      a user interface configured for controlling the making and dispensing of the food product;
      a controller with an operating system connected with the user interface;
   measuring one or more operating parameters of the machine using at least one sensor;
   activating a first data communication with the at least one sensor for obtaining the operating parameters,
   receiving the operating parameters through a first communication channel;
   activating a second data communication with the user interface wherein the user interface is configured for receiving commands from a user representing settings of selectable preparations;
   receiving the commands through the second communication channel;
   controlling the at least one actuator as a function of:
      the one or more operating parameters received through the first communication channel;
      the commands received through the second communication channel;
   performing the above steps using predetermined instructions, wherein the steps of receiving the one or more operating parameters through the first communication channel follow the steps of:
      continuously monitoring the one or more operating parameters received from the at least one sensor;
      processing the one or more operating parameters as a function of communication libraries determining processed operational information;
      sending to the user interface the processed operational information, the information determining the settings of selectable preparations;
   wherein the predetermined instructions include a first state based machine, comprising a first plurality of states for controlling the at least one actuator as a function of a signal from the at least one sensor and the commands from the user to control a progress through the first plurality of states in complying with the commands from the user, the first state based machine checking the one or more operating parameters in a current one of the first plurality of states and upon meeting a predetermined condition of the one or more operating parameters, changing to a further one of the first plurality of states;
   wherein the predetermined instructions include a second state based machine, distinct from the first state based machine, the second state based machine comprising a second plurality of states for controlling the at least one actuator and the state of the at least one containment tank;
   providing that the at least one containment tank includes a first containment tank for a basic liquid product and a second containment tank for a second basic liquid product;
   wherein the second state based machine is also configured to manage a simultaneous operation of the first and second containment tanks, including performance of process cycles simultaneously in the first and second containment tanks;
   providing that an output of the compressor is shared between the first and second tanks, and the second state based machine is configured to adjust a speed of the compressor as a function of states of the first and second containment tanks in order to provide the simultaneous operation of the first and second containment tanks;
   implementing the steps with the controller using the predetermined instructions, wherein the predetermined instructions are part of the operating system;

wherein the step of controlling the at least one actuator simultaneously controls at least a first actuator acting on the basic liquid product and a second actuator acting on the second basic liquid product;

wherein the operating system is a Linux distribution;

wherein the operating system comprises a plurality of software components, communicating with each other through an asynchronous interaction mode;

setting a priority of execution of each of the software components on the operating system;

executing the first state based machine and the second state based machine in a kernel space of the operating system;

saving a current state of the machine.

2. The method for making and dispensing according to claim 1, comprising using the controller to read from and/or write in the first communication channel and/or the second communication channel as a function of the communication libraries.

3. The method for making and dispensing according to claim 1, and further comprising providing that the first communication channel and/or the second communication channel comprises a Modbus channel.

4. The method for making and dispensing according to claim 1, and further comprising providing that communication on the first communication channel and/or the second communication channel is made using a RTU or TCP/IP protocol.

5. The method for making and dispensing according to claim 1, and further comprising the steps of:

cooling or heating the first containment tank using a system for cooling or heating the basic liquid product;

cooling or heating the second containment tank using a system for cooling or heating the second basic liquid product.

6. The method for making and dispensing according to claim 1, and further comprising the step of cooling and/or heating both of the first and second containment tanks using the compressor as a single compressor.

7. The method for making and dispensing according to claim 1, and further comprising providing that the predetermined instructions are contained within a processing software module.

* * * * *